United States Patent
Moore (10) Patent No.: US 10,222,623 B2
(45) Date of Patent: Mar. 5, 2019

(54) COMPOSITE GRADED-INDEX FIBER MODE FIELD ADAPTOR FOR HIGH-ASPECT-RATIO CORE OPTICAL FIBERS

(71) Applicant: RAYTHEON COMPANY, Waltham, MA (US)

(72) Inventor: Sean Moore, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 77 days.

(21) Appl. No.: 15/497,914

(22) Filed: Apr. 26, 2017

(65) Prior Publication Data

US 2018/0314071 A1    Nov. 1, 2018

(51) Int. Cl.
| G02B 6/028 | (2006.01) |
| G02B 6/26 | (2006.01) |
| G02B 6/02 | (2006.01) |
| G02B 6/32 | (2006.01) |
| G02B 27/09 | (2006.01) |
| H01S 3/067 | (2006.01) |
| H01S 3/23 | (2006.01) |
| H01S 3/00 | (2006.01) |

(52) U.S. Cl.
CPC ......... *G02B 27/0994* (2013.01); *G02B 6/028* (2013.01); *G02B 6/02009* (2013.01); *G02B 6/262* (2013.01); *G02B 6/32* (2013.01); *G02B 27/0927* (2013.01); *G02B 27/0955* (2013.01); *H01S 3/005* (2013.01); *H01S 3/06729* (2013.01); *H01S 3/06754* (2013.01); *H01S 3/2308* (2013.01)

(58) Field of Classification Search
CPC ............ G02B 27/0994; G02B 27/0927; G02B 27/0955; G02B 6/02009; G02B 6/028; G02B 6/262; G02B 6/32; G02B 6/26; H01S 3/06716; H01S 3/06729
USPC ............ 385/27–28, 31, 33, 39, 43, 123–124
See application file for complete search history.

(56) References Cited

U.S. PATENT DOCUMENTS

| 7,860,360 | B2 | 12/2010 | Rockwell et al. |
| 7,983,312 | B2 | 7/2011 | Shkunov et al. |
| 8,606,062 | B2 | 12/2013 | Shkunov et al. |
| 2010/0189392 | A1 | 7/2010 | Rockwell et al. |
| 2013/0142481 | A1 | 6/2013 | Rockwell et al. |

FOREIGN PATENT DOCUMENTS

EP    2211216 A1    7/2010

OTHER PUBLICATIONS

International Search Report and Written Opinion in application No. PCT/US2018/027929 dated Jul. 5, 2018.

*Primary Examiner* — Michael P Mooney
(74) *Attorney, Agent, or Firm* — Lando & Anastasi, LLP (57) ABSTRACT

A fiber-based composite graded-index (GRIN) mode field adaptor configured to receive a circular Gaussian beam and to reformat the circular Gaussian beam into an elliptical Gaussian beam. Certain examples provide a fiber laser system including an input fiber configured to produce a circular Gaussian input beam, a semi-guiding high aspect ratio (SHARC) fiber, and the composite GRIN mode field adaptor coupled between the input fiber and the SHARC fiber, the composite GRIN mode field adaptor including a pair of GRIN lens fibers and being configured to receive the circular Gaussian input beam from the input fiber and to reformat the circular Gaussian input beam into an elliptical Gaussian beam to be coupled into the SHARC fiber.

15 Claims, 5 Drawing Sheets

COMPOSITE GRADED-INDEX FIBER MODE FIELD ADAPTOR FOR HIGH-ASPECT-RATIO CORE OPTICAL FIBERS

BACKGROUND

Fiber lasers can be used in many applications. Fiber lasers are more compact, more reliable, and more efficient relative to solid state lasers, and can provide robust single-mode output, making them suitable for high energy and/or high power laser systems that generate optical beams for industrial, military, and long range lidar/ladar applications, for example.

Figure 1A:
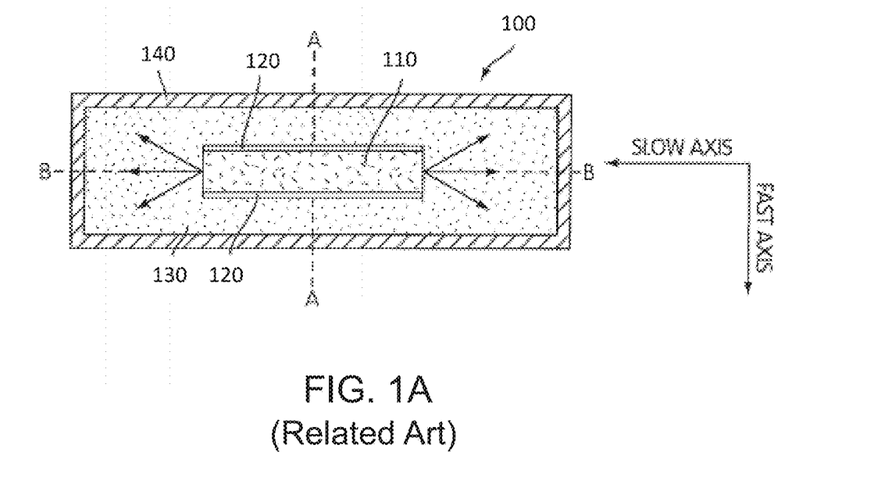
FIG. 1A is a transverse cross-sectional view of one example of a semi-guiding high aspect ratio core (SHARC) fiber laser.

An example of a fiber laser architecture is the semi-guiding high aspect ratio core (SHARC) architecture. Detailed descriptions of the SHARC architecture can be found in U.S. Pat. Nos. 8,606,062 and 7,983,312. FIG. 1A shows a transverse cross-sectional view of an example of a SHARC fiber laser. The SHARC fiber laser 100 includes a high aspect ratio core 110, signal claddings 120, a pump cladding 130 (also referred to as a mode index matching cladding), and a coating 140. The core 110 is sandwiched between the two signal claddings 120. The core 110 can have an aspect ratio between approximately 30:1 and 100:1, depending on the application. The core 100 includes an active dopant material. The active dopant material can be distributed in the core 110 according to a desired transverse distribution profile to control the gain profile within the core. The active dopant material can be active dopant ions (active lasing dopant ions or active amplifying dopant ions), such as Ytterbium ions, Erbium ions, Thulium ions, or a combination of two or more of these ions. The core 110 and the signal claddings 120 are surrounded by the pump cladding 130. The coating 140 covers the pump cladding 130. The coating 140 may be a polymer coating or any other flexible coating. For a high aspect ratio core 110, the expanded or "long" dimension is traditionally referred to as the slow axis, while the narrow dimension is referred to as the fast axis, as indicated in FIG. 1A.

Figure 1B:
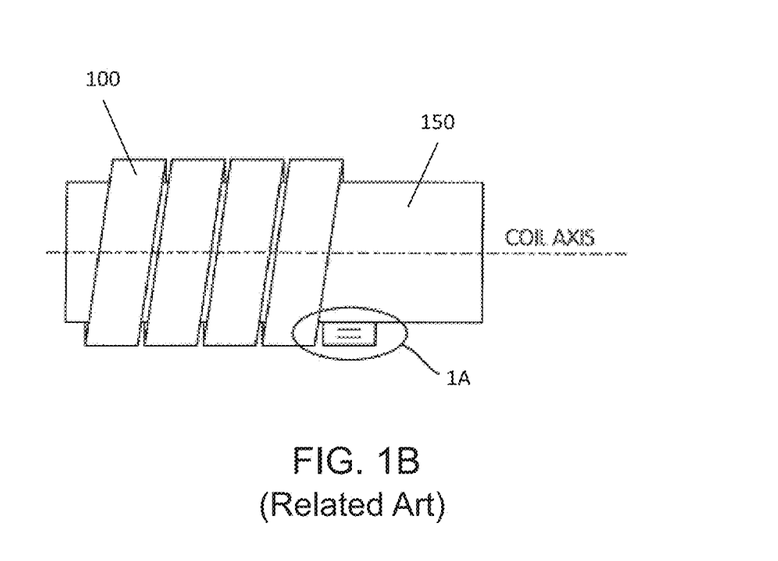
FIG. 1B is a diagram showing the SHARC fiber laser of FIG. 1A spirally wound around a carrier.

The use of a planar structure for the core 110 allows for an increase in the core cross-sectional area, and therefore the laser output power, without a corresponding increase in signal intensity. The pump cladding 130 and coating 140 need not be planar and can maintain a more conventional circular shape even for a high aspect ratio planar core 110. However, it is common for the entire SHARC fiber 100 to be planar, as shown in FIG. 1A. Thus, the SHARC fiber laser 100 has a ribbon-like geometry, allowing it to be coiled in a spiral conformation around a carrier 150, as shown in FIG. 1B. The carrier 150 can include a cooling system or cooling structure for cooling the SHARC fiber laser 100. In the example shown in FIG. 1A, the core 100 is centered within SHARC fiber laser 100, such that the vertical axis AA divides the SHARC fiber laser 100 into two substantially identical symmetrical halves, and the horizontal axis BB similarly divides the SHARC fiber laser 100 into two substantially identical symmetrical halves. However, the core 110 and signal claddings 120 need not be centered within the SHARC fiber laser 100, and can be offset from either axis AA or axis BB.

A conventional circular fiber laser having a circular core is fed by a circular Gaussian beam. In contrast, the SHARC fiber laser 100 is fed with an elliptical beam due to the high aspect ratio core. Several free-space optics methods are known to be effective for changing a beam format from a collimated round shape to a collimated elliptical shape. For example, one or more cylindrical lenses can be used to achieve beam formatting and free-space optical coupling of an initially circular beam into a planar fiber waveguide. A disadvantage of free-space optical coupling methods however, is that the optical components are bulky and require precise alignment. U.S. Pat. No. 7,860,360 discloses a modified monolithic step-index slab/planar waveguide structure configured to convert circular Gaussian beams into elliptical Gaussian beams. The structure can be "spliced" between a circularly symmetrical step-index core fiber and a SHARC fiber laser and used to convert Gaussian modes of the step-index fiber into elliptical Gaussian modes mode-matched to the fundamental modes of the SHARC fiber laser.

SUMMARY OF INVENTION

Aspects and embodiments are directed to fiber-like planer waveguides having a modified core configured to transform a circular Gaussian beam into an elliptical beam suitable for coupling into SHARC fibers. Similar to the device disclosed in U.S. Pat. No. 7,860,360, embodiments of the structures disclosed herein can be spliced between circularly symmetric step-index core fibers and high aspect ratio fibers. However, the device disclosed in U.S. Pat. No. 7,860,360 uses a modified planar waveguide structure to convert the modes of the former to the latter. By contrast, aspects and embodiments disclosed herein leverage standard, commercially available graded index (GRIN) optical fibers to reformat circularly symmetric Gaussian modes into elliptical Gaussian modes suitable for SHARC fibers.

According to one embodiment a fiber-based composite graded-index (GRIN) mode field adaptor is configured to receive a circular Gaussian beam and to reformat the circular Gaussian beam into an elliptical Gaussian beam. The composite GRIN mode field adaptor comprises a two-dimensional GRIN lens fiber having a circularly symmetric refractive index gradient in two orthogonal directions and having a first length, the two orthogonal directions corresponding to a slow-axis direction and a fast-axis direction of the composite GRIN mode filed adaptor, the two-dimensional GRIN lens fiber being configured to receive the circular Gaussian beam having an input beam waist at an input facet of the two-dimensional GRIN lens fiber and to expand the input beam waist to an output beam waist at an output facet of the two-dimensional GRIN lens fiber. The composite GRIN mode field adaptor further comprises a one-dimensional GRIN lens fiber spliced to the two-dimensional GRIN lens fiber, the one-dimensional GRIN lens fiber having a circularly symmetric refractive index gradient in the fast-axis direction and having the first length, the one-dimensional GRIN lens fiber being configured to reduce the output beam waist in the fast-axis direction to the input beam waist at an output facet of the one-dimensional GRIN lens fiber to produce at the output facet of the one-dimensional GRIN lens fiber the elliptical Gaussian beam.

In one example the first length corresponds to $\pi/2g_0$, where $g_0$ is a refractive index gradient constant of the two-dimensional GRIN lens fiber. In another example the one-dimensional GRIN lens fiber has the refractive index variation constant, $g_0$. In one example the first length is in a range of 2-4 millimeters. In another example the first length is in a range of 2-3 millimeters.

According to another embodiment, a fiber laser system comprises an input fiber configured to produce a circular Gaussian input beam, a semi-guiding high aspect ratio (SHARC) fiber, and a composite graded-index (GRIN)

mode field adaptor coupled between the input fiber and the SHARC fiber, the composite GRIN mode field adaptor including a pair of GRIN lens fibers and being configured to receive the circular Gaussian input beam from the input fiber and to reformat the circular Gaussian input beam into an elliptical Gaussian beam to be coupled into the SHARC fiber.

In one example the pair of GRIN lens fibers includes a two-dimensional GRIN lens fiber having a first input facet coupled to the input fiber, and a first output facet, the two-dimensional GRIN lens fiber having a circularly symmetric refractive index in both a slow-axis direction of the fiber laser system and a fast-axis direction of the fiber laser system, and a one-dimensional GRIN lens fiber having a second input facet coupled to the first output facet, and a second output facet coupled to the SHARC fiber, the one-dimensional GRIN lens fiber having a circularly symmetric refractive index in the fast-axis direction. In one example the two-dimensional GRIN lens fiber and the one-dimensional GRIN lens fiber have a same length and a same refractive index gradient constant ($g_0$). In another example the length of each of the two-dimensional GRIN lens fiber and the one-dimensional GRIN lens fiber is $\pi/2g_0$. In another example the length of each of two-dimensional GRIN lens fiber and the one-dimensional GRIN lens fiber is in a range of 2-4 millimeters. In one example the circular Gaussian input beam has an input beam waist at the first input facet, and wherein the two-dimensional GRIN lens fiber is configured to expand the input beam waist to an output beam waist at the first output facet. The one-dimensional GRIN lens fiber may be configured to reduce the output beam waist in the fast-axis direction to the input beam waist at the second output facet to produce at the second output facet the elliptical Gaussian beam having the output beam waist in the slow-axis direction and the input beam waist in the fast-axis direction. In one example the output beam waist in the slow-axis direction at the second output facet matches a slow-axis mode field diameter of the SHARC fiber. In another example the input beam waist in the fast-axis direction at the second output facet matches a fast-axis mode field diameter of the SHARC fiber. In one example the input fiber is a large mode area fiber. In another example the input fiber is a step-index fiber.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to a device configured to convert the circularly symmetric fundamental mode of a single-mode or large mode area (weakly multi-mode) fiber into a high aspect ratio collimated elliptical Gaussian mode suitable for exciting the fundamental (diffraction-limited) mode of SHARC fibers in a monolithic, all-fiber architecture. The device eliminates the need to use free-space reformatting optics to couple circular diffraction-limited Gaussian beams from laser sources into modes to the diffraction-limited fundamental mode of SHARC fibers. According to certain embodiments, efficient coupling is achieved with an all-fiber device that greatly reduces the size, weight, and cost of fiber laser systems, eliminates tight optical alignment tolerances, and improves system stability. Further, embodiments can make SHARC master oscillator power amplifiers (MOPAs) much less alignment sensitive and robust against environmental disturbances. In addition, the number of optics needed to field a SHARC based MOPA system can be reduced, and the architecture of such a system can be simplified.

According to certain embodiments, the device is a composite GRIN mode field adaptor, including two graded-index (GRIN) fibers spliced together with prescribed refractive index gradients and lengths. A GRIN fiber is an optical fiber whose core has a refractive index that decreases with increasing radial distance from the optical axis of the fiber. Because the composite GRIN mode field adaptor is fiber-based, it can be spliced between step-index and SHARC fibers, thereby eliminating the need for free-space reformatting optics and, consequently, for strict optical alignment tolerances. A step-index fiber is an optical fiber having a refractive index profile characterized by a uniform refractive index within the core and a sharp decrease in refractive index at the core-cladding interface so that the cladding is of a lower refractive index. The step-index profile corresponds to a power-law index profile with the profile parameter approaching infinity. The step-index profile is commonly used in many single-mode fibers and some multimode fibers. The all-fiber architecture of composite GRIN mode field adaptor may provide efficient coupling between commercially available step-index fibers and SHARC fibers in a compact, lightweight, and robust package largely immune to environmental perturbations.

Aspects and embodiments leverage well understood properties of GRIN fibers. As discussed in more detail below, according to one embodiment, the circular Gaussian (fundamental) mode from a step-index fiber is launched into a 2D GRIN lens fiber (i.e., one having a circularly symmetric refractive index gradient in two directions) that expands and collimates the beam after a given propagation distance. Both the index gradient and length are selected such that the beam diameter of the resulting circularly symmetric, collimated beam is mode-matched to the slow-axis (wide dimension) of the SHARC fundamental mode. A 1D GRIN lens fiber (symmetric refractive index gradient only along one direction) spliced to the 2D GRIN lens then focuses and re-collimates the beam along the fast-axis to match the SHARC fundamental mode in this direction. Because the index gradient is one-dimensional and aligned to the fast-axis direction, the slow-axis dimension of the collimated beam is unaffected by the 1D GRIN lens. The $1/e^2$ fundamental mode size along the slow-axis of the SHARC fiber is typically 200-400 microns with corresponding Rayleigh ranges of 2-10 centimeters. By contrast, in certain embodiments the length of the GRIN lenses is only 2-3 mm. As such, the beam expands very little after propagating through the second 1D GRIN lens and remains well matched to the SHARC fundamental mode along the slow-axis direction. Thus, embodiments of the composite GRIN mode field adaptor provide an all-fiber device that converts the fundamental mode of a step-index fiber into the high aspect elliptical Gaussian mode of a SHARC fiber with minimal loss.

Figure 2:
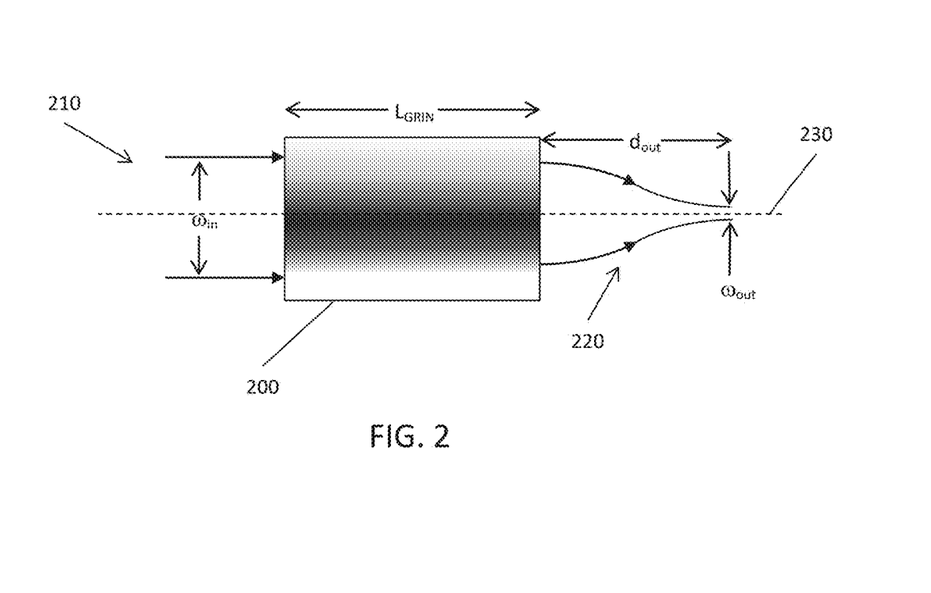
FIG. 2 is a diagram showing the focusing properties of 2D GRIN lens, with the beam waist at the input facet of the lens, according to aspects of the present invention.

FIG. 2 is a diagram illustrating the focusing properties of a 2D GRIN lens fiber 200. A collimated Gaussian beam 210 (beam waist) is incident on the 2D GRIN lens fiber 200 from left with $1/e^2$ size $w_{in}$, and is focused to a spot size $w_{out}$ at distance $d_{out}$ from the output facet of the 2D GRIN lens fiber 200 corresponding to a collimated output beam 220. The 2D GRIN lens fiber 200 has a length $L_{GRIN}$. The variation in refractive index as a function of the radial distance with respect to the longitudinal axis 230 of the 2D GRIN lens fiber 200 is given by Equation 1:

$$n(r) = n_0(1 - g_0^2 r^2) \qquad (1)$$

In Equation (1), $n_0$ is the index of refraction on the longitudinal axis, r is the radial distance with respect to the longitudinal axis, and $g_0$ is the refractive index gradient constant of the 2D GRIN lens fiber 200. It is assumed that the index of refraction is uniform along the z-direction.

Figure 3:
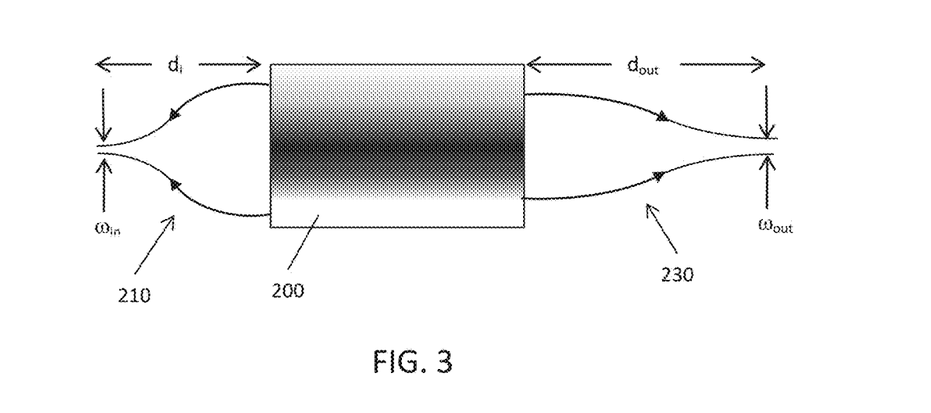
FIG. 3 is a diagram showing an example of a 2D GRIN lens configured as a focusing optic, according to aspects of the present invention.

FIG. 3 shows the use of the 2D GRIN lens fiber 200 as a focusing optic. The focused beam waist relative to the output facet of the 2D GRIN lens fiber 200 is given by Equation (2).

$$w_{out} = \frac{w_{in}}{\left(\left(\frac{\dot{H}_2}{a}\right)^2 + (H_1 + n_0 d_{in} \dot{H}_2)^2\right)^{\frac{1}{2}}} \qquad (2)$$

In Equation (2), $H_2$ is $\cos(g_0 z)$, $H_1$ is $\sin(g_0 z)$, $\dot{H}_1$ and $\dot{H}_2$ are the derivatives of $H_1$ and $H_2$ with respect to z evaluated at $L_{GRIN}$, respectively, $d_{in}$ is the distance from the input beam waist to the 2D GRIN lens fiber 200, $w_{in}$ is the input beam waist, $w_{out}$ is the output beam waist, and a is given by Equation (3).

$$a = \frac{\lambda}{\pi w_{in}^2 n_0} \qquad (3)$$

Note that $d_{out}$ shown in FIG. 3 is eliminated in Equation (2).

According to certain embodiments, the 2D GRIN lens fiber 200 is configured to expand the beam waist $w_{in}$ of the input beam 210 at the input facet of the 2D GRIN lens fiber and re-collimating the input beam to provide the output beam 220 having a beam waist $w_{out}$ at the output facet of the 2D GRIN lens fiber that matches the slow-axis mode field diameter (MFD) of the SHARC fiber into which the output beam is to be coupled. It is important to note that the MFD of the step-index fiber from which the input beam 210 is received does not need to match the fast-axis MFD of the SHARC fiber to achieve high coupling efficiency into the fundamental mode of the latter. The refractive index gradient of the 1D GRIN lens fiber can be selected to refocus the beam spot size in the fast axis direction to any size compatible with the fundamental mode of the SHARC fiber. However, the different index gradients of the 2D and 1D GRIN fiber lenses necessitate that different lengths be used to reformat and refocus the beam to the appropriate size. In the calculations that follow, the MFD of the step-index fiber is selected to match the fast-axis MFD of the SHARC fiber to reduce the complexity of the device. This is not an oversimplification of the treatment since the fundamental mode MFD of large mode area (LMA) fibers is very comparable to the fast axis MFD of SHARC fibers (e.g., 20-25 microns).

To expand the beam waist $w_{in}$ at the input facet of the 2D GRIN lens fiber 200 and re-collimate to the beam waist $w_{out}$ at the output facet that matches the slow-axis mode field diameter (MFD) of the SHARC fiber, as discussed above, $d_{in}$ in Equation (2) is set to zero, which is equivalent to placing the input beam waist at the input facet of the 2D GRIN lens fiber 200, as shown on the left hand side of FIG. 2. Equation (2) then becomes:

$$w_{out} = \frac{w_{in}}{\sqrt{\left(\frac{g_0 \sin(g_0 L_{GRIN})}{a}\right)^2 + (\cos(g_0 L_{GRIN}))^2}} \qquad (4)$$

The distance $d_{out}$ at which the output beam 220 is focused with respect to the output facet of the 2D GRIN lens fiber 200 when $d_{in}=0$ (the input beam waist is located at the input facet of the 2D GRIN lens fiber 200, as shown in FIG. 2), is given by Equation (5):

$$d_{out} = \frac{\left(-g_0 + \frac{a^2}{g_0}\right)\sin(g_0 L_{GRIN})\cos(g_0 L_{GRIN})}{n_0[(g_0 \sin(g_0 L_{GRIN}))^2 + a^2(\cos(g_0 L_{GRIN}))^2]} \qquad (5)$$

Figure 4:
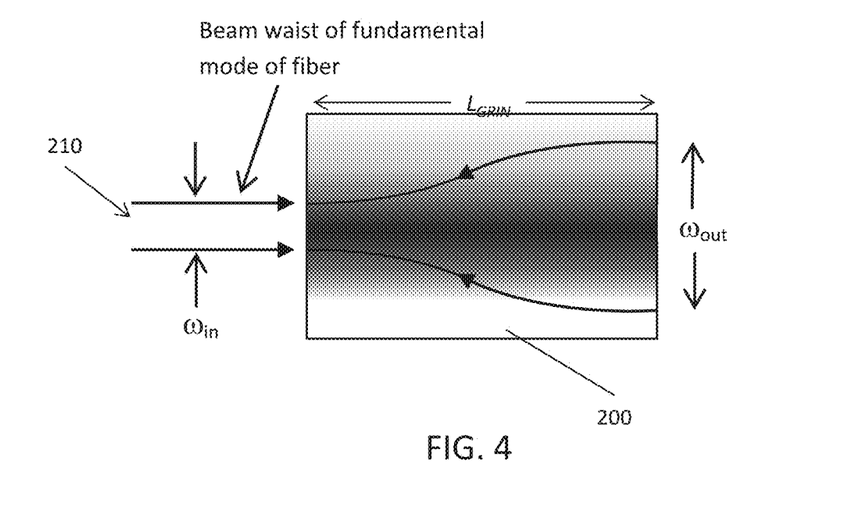
FIG. 4 is a diagram showing an example of a 2D GRIN lens configured as beam expander and collimator for fiber along the slow-axis, with the input and output beam waists positioned at the input and output facets of the 2D GRIN lens, respectively, according to aspects of the present invention.

FIG. 4 is a diagram showing the 2D GRIN lens fiber 200 as a beam expander and collimator for fiber along the slow axis. According to one embodiment, it is desired to place the output beam waist at the output facet of the 2D GRIN lens fiber when the input beam waist is located at the input facet, as shown in FIG. 4. This requires setting the numerator on the right hand side of Equation (5) to zero. For arbitrary $g_0$, $\lambda$, and $w_{in}$ it follows that $\sin(g_0 L_{GRIN})*\cos(g_0 L_{GRIN})=0$, which occurs at intervals of $L_{GRIN}=N\pi/2g_0$ (N=0, 1, 2, ...). The first zero at N=0 is unphysical since in this case there would be no 2D GRIN lens. The next zero occurs at $L_{GRIN}=\pi/2g_0$ and gives the first value of $L_{GRIN}$ at which $w_{out}$ is located at the 2D GRIN lens output facet ($d_{out}=0$) as shown in FIG. 4. Other values of $L_{GRIN}$ for which $d_{out}=0$ are higher multiples of $\pi/2g_0$. However, in certain embodiments it is desirable to make the composite GRIN mode field adaptor as short as possible, and therefore, $L_{GRIN}=\pi/2g_0$ can be selected. Setting $L_{GRIN}=\pi/2g_0$ in Equation (5) gives, $$w_{out} = \frac{w_{in}}{\left(\frac{g_0}{a}\right)} \qquad (6)$$

From Equation (6) it can be seen that the output beam waist, $w_{out}$, at the output facet of a 2D GRIN lens of length $\pi/2g_0$ is a function of $w_{in}$, $g_0$, $n_0$, and $\lambda$. The refractive index variation constant, $g_0$, can be tailored to give a desired $w_{out}$ for a given $w_{in}$. It is important to keep in mind that changing $g_0$ also changes the length of the GRIN lens required to place $w_{out}$ at the output facet.

According to one embodiment, after the beam has been expanded and collimated at $L_{GRIN}$ to match the slow-axis MFD of the SHARC fiber into which it is to be coupled, the beam is re-focused along the fast-axis to match the fast-axis MFD without altering the slow-axis dimensions at $L_{GRIN}$. This can be accomplished by splicing a 1D GRIN lens of equal length ($L_{GRIN}$) and refractive index variation constant ($g_0$) to the 2D GRIN lens 200, with the 1D refractive index variation oriented such that it only effects the fast-axis of the collimated beam at $L_{GRIN}$. By symmetry this arrangement will re-focus the beam waist back to $w_{in}$ at distance $2L_{GRIN}$ from the input, as shown in FIGS. 5A and 5B.

Figure 5A:
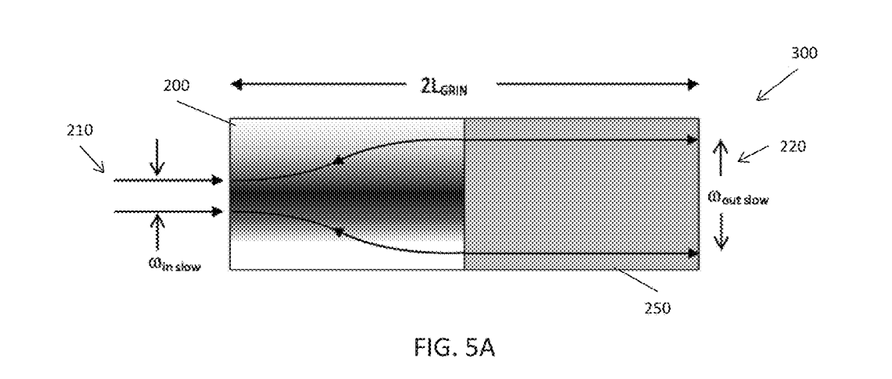
FIG. 5A is a diagram of one example of a composite GRIN mode field adaptor for Gaussian-to-elliptical beam waist shaping, shown along the slow-axis of the fibers, according to aspects of the present invention.
Figure 5B:
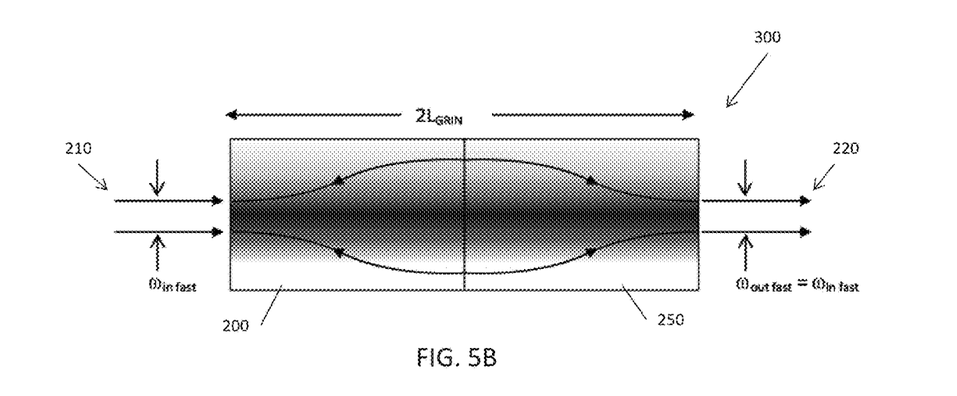
FIG. 5B is a diagram showing the example of the composite GRIN mode field adaptor for Gaussian-to-elliptical beam waist shaping along the fast-axis of the fibers, according to aspects of the present invention.

Referring to FIGS. 5A and 5B, illustrated is one example of a composite GRIN mode field adaptor 300, including a 1D GRIN lens fiber 250 spliced to the 2D GRIN lens fiber 200. FIG. 5A shows the input and output beams, and the refractive index gradients, along the slow-axis of the lens fibers, and FIG. 5B shows the input and output beams, and the refractive index gradients, along the fast-axis of the lens fibers. As shown, and as discussed above, the 2D GRIN lens fiber 200 has a circularly symmetric refractive index gradient in both the slow-axis and fast-axis directions, whereas the 1D GRIN lens fiber 250 only has a circularly symmetric refractive index gradient in the fast-axis direction. As a result, the output beam waist, $w_{out}$, is different on the slow-axis versus on the fast-axis. In the illustrated example, the output beam waist, $w_{out}$, is larger on the slow-axis than on the fast-axis because the 2D GRIN lens fiber 200 acts as a beam expanded on the slow-axis, as discussed above. In one embodiment, because $L_{GRIN}$ is very short compared to the Rayleigh range along the slow-axis (e.g., 2-3 mm vs. 10 cm), the slow-axis beam diameter is virtually the same at $L_{GRIN}$ and $2L_{GRIN}$ as depicted in FIG. 5A, resulting in low coupling loss along this direction. As discussed above, the input beam 210 is circular, and thus the input beam waist, $w_{in}$, is approximately the same on both the slow-axis and the fast-axis, as shown in FIGS. 5A and 5B. In contrast, as discussed above, the output beam waist, $w_{out}$, is different on the two axes, and therefore the output beam 220 is elliptical. Thus, the composite GRIN mode field adaptor 300 acts to reformat the circular fundamental (Gaussian) mode of the input beam 210 into an elliptical mode that is matched to the fundamental mode of the SHARC fiber into which the output beam 220 is to be coupled.

Figure 6:
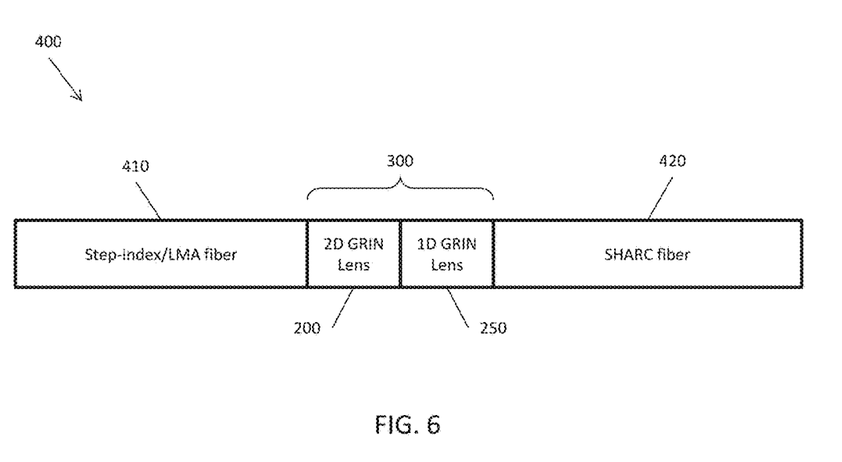
FIG. 6 is a block diagram of one example of a fiber laser system including a composite GRIN mode field adaptor according to aspects of the present invention.

FIG. 6 is a block diagram of one example of a fiber laser system including the composite GRIN mode field adaptor 300 according to certain embodiments. The system includes an input fiber 410 that is a step-index or large mode area (LMA) fiber, for example, and a SHARC fiber 420. The composite GRIN mode field adaptor 300 is spliced between the input fiber 410 and the SHARC fiber 420. The composite GRIN mode field adaptor 300 includes the 2D GRIN lens fiber 200 coupled to the 1D GRIN lens fiber 250. As discussed above, the composite GRIN mode field adaptor 300 leverages the focusing and collimating properties of readily available GRIN fibers, which are selected and configured to provide the 2D GRIN lens fiber 200 and the 1D GRIN lens fiber 250, to efficiently couple between the input fiber 410 and the SHARC fiber 420 in an all-fiber architecture. The composite GRIN mode field adaptor 300 reformats the circularly symmetric mode of the input fiber 410 into an elliptical Gaussian beam mode-matched to the SHARC fiber 420. As shown in FIG. 6, the composite GRIN mode field adaptor 300 can be directly spliced between the input fiber 410 and the SHARC fiber 420, yielding a robust, compact, and alignment insensitive all-fiber architecture.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, it is to be appreciated that embodiments discussed herein are not limited in application to the details of construction and the arrangement of components set forth in the foregoing description or illustrated in the accompanying drawings. The methods and apparatuses disclosed herein are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Accordingly, the foregoing description and drawings are by way of example only, and the scope of the invention should be determined by proper construction of the appended claims, and their equivalents.

What is claimed is:

1. A fiber-based composite graded-index (GRIN) mode field adaptor configured to receive a circular Gaussian beam and to reformat the circular Gaussian beam into an elliptical Gaussian beam, the composite GRIN mode field adaptor comprising:

a two-dimensional GRIN lens fiber having a circularly symmetric refractive index gradient in two orthogonal directions and having a first length, the two orthogonal directions corresponding to a slow-axis direction and a fast-axis direction of the composite GRIN mode field adaptor, the two-dimensional GRIN lens fiber being configured to receive the circular Gaussian beam having an input beam waist at an input facet of the two-dimensional GRIN lens fiber and to expand the input beam waist to an output beam waist at an output facet of the two-dimensional GRIN lens fiber; and
a one-dimensional GRIN lens fiber spliced to the two-dimensional GRIN lens fiber, the one-dimensional GRIN lens fiber having a circularly symmetric refractive index gradient in the fast-axis direction and having the first length, the one-dimensional GRIN lens fiber being configured to reduce the output beam waist in the fast-axis direction to the input beam waist at an output facet of the one-dimensional GRIN lens fiber to produce at the output facet of the one-dimensional GRIN lens fiber the elliptical Gaussian beam.

2. The fiber-based composite GRIN mode field adaptor of claim 1 wherein the first length corresponds to $\pi/2\, g_0$, where $g_0$ is a refractive index gradient constant of the two-dimensional GRIN lens fiber.

3. The fiber-based composite GRIN mode field adaptor of claim 1 wherein the one-dimensional GRIN lens fiber has the refractive index variation constant, $g_0$.

4. The fiber-based composite GRIN mode field adaptor of claim 1 wherein the first length is in a range of 2-4 millimeters.

5. The fiber-based composite GRIN mode field adaptor of claim 4 wherein the first length is in a range of 2-3 millimeters.

6. A fiber laser system comprising:
an input fiber configured to produce a circular Gaussian input beam;
a semi-guiding high aspect ratio (SHARC) fiber; and
a composite graded-index (GRIN) mode field adaptor coupled between the input fiber and the SHARC fiber, the composite GRIN mode field adaptor including a pair of GRIN lens fibers and being configured to receive the circular Gaussian input beam from the input fiber and to reformat the circular Gaussian input beam into an elliptical Gaussian beam to be coupled into the SHARC fiber, wherein the pair of GRIN lens fibers includes:
a two-dimensional GRIN lens fiber having a first input facet coupled to the input fiber, and a first output facet, the two-dimensional GRIN lens fiber having a circularly symmetric refractive index in both a slow-axis direction of the fiber laser system and a fast-axis direction of the fiber laser system, and
a one-dimensional GRIN lens fiber having a second input facet coupled to the first output facet, and a second output facet coupled to the SHARC fiber, the one-dimensional GRIN lens fiber having a circularly symmetric refractive index in the fast-axis direction.

7. The fiber laser system of claim 6 wherein the two-dimensional GRIN lens fiber and the one-dimensional GRIN lens fiber have a same length and a same refractive index gradient constant ($g_0$).

8. The fiber laser system of claim 7 wherein the length of each of the two-dimensional GRIN lens fiber and the one-dimensional GRIN lens fiber is $\pi/2\, g_0$.

9. The fiber laser system of claim 7 wherein the length of each of two-dimensional GRIN lens fiber and the one-dimensional GRIN lens fiber is in a range of 2-4 millimeters.

10. The fiber laser system of claim 6 wherein the circular Gaussian input beam has an input beam waist at the first input facet, and wherein the two-dimensional GRIN lens fiber is configured to expand the input beam waist to an output beam waist at the first output facet.

11. The fiber laser system of claim 10 wherein the one-dimensional GRIN lens fiber is configured to reduce the output beam waist in the fast-axis direction to the input beam waist at the second output facet to produce at the second output facet the elliptical Gaussian beam having the output beam waist in the slow-axis direction and the input beam waist in the fast-axis direction.

12. The fiber laser system of claim 11 wherein the output beam waist in the slow-axis direction at the second output facet matches a slow-axis mode field diameter of the SHARC fiber.

13. The fiber laser system of claim 12 wherein the input beam waist in the fast-axis direction at the second output facet matches a fast-axis mode field diameter of the SHARC fiber.

14. The fiber laser system of claim 6 wherein the input fiber is a large mode area fiber.

15. The fiber laser system of claim 6 wherein the input fiber is a step-index fiber.

* * * * *